United States Patent
Qian et al.

(10) Patent No.: US 8,912,266 B2
(45) Date of Patent: Dec. 16, 2014

(54) THERMOPLASTIC ELASTOMERS EXHIBITING SUPERIOR BARRIER PROPERTIES

(71) Applicants: Guoqiang Qian, Buffalo Grove, IL (US); Liang Xu, Arlington Heights, IL (US); Krishna Venkataswamy, Crystal Lake, IL (US)

(72) Inventors: Guoqiang Qian, Buffalo Grove, IL (US); Liang Xu, Arlington Heights, IL (US); Krishna Venkataswamy, Crystal Lake, IL (US)

(73) Assignee: PolyOne Corporation, Avon Lake, OH (US)

( * ) Notice: Subject to any disclaimer, the term of this patent is extended or adjusted under 35 U.S.C. 154(b) by 0 days.

(21) Appl. No.: 14/137,182

(22) Filed: Dec. 20, 2013

(65) Prior Publication Data

US 2014/0107269 A1    Apr. 17, 2014

Related U.S. Application Data

(63) Continuation of application No. 12/936,372, filed as application No. PCT/US2009/040906 on Apr. 17, 2009, now abandoned.

(60) Provisional application No. 61/047,047, filed on Apr. 22, 2008.

(51) Int. Cl.

| | |
|---|---|
| *C08K 3/34* | (2006.01) |
| *B82Y 30/00* | (2011.01) |
| *C08J 3/22* | (2006.01) |
| *C08J 5/00* | (2006.01) |
| *C08L 23/22* | (2006.01) |
| *C08L 53/00* | (2006.01) |
| *C08L 77/00* | (2006.01) |
| *C08K 3/00* | (2006.01) |
| *C08K 5/00* | (2006.01) |
| *C08L 25/08* | (2006.01) |

(52) U.S. Cl.
CPC ................ *B82Y 30/00* (2013.01); *C08K 3/346* (2013.01); *C08J 3/226* (2013.01); *C08J 5/005* (2013.01); *C08J 2353/00* (2013.01); *C08J 2477/00* (2013.01); *C08K 3/0033* (2013.01); *C08K 5/0016* (2013.01); *C08L 23/22* (2013.01); *C08L 53/00* (2013.01); *C08L 77/00* (2013.01); *C08L 25/08* (2013.01)
USPC .......................................... 524/445; 524/505

(58) Field of Classification Search
CPC ......... C08K 3/346; C08L 77/00; C08L 53/00; C08L 2201/14
USPC .................................. 524/445, 505
See application file for complete search history.

(56) References Cited

U.S. PATENT DOCUMENTS

| | | | |
|---|---|---|---|
| 6,407,155 B1 * | 6/2002 | Qian et al. ................ 524/445 |
| 6,414,081 B1 | 7/2002 | Ouhadi | |
| 6,417,262 B1 | 7/2002 | Turner et al. | |
| 6,423,768 B1 | 7/2002 | Khouri | |
| 6,436,547 B1 | 8/2002 | Toft | |
| 7,150,294 B2 * | 12/2006 | Katayama et al. ............ 138/137 |
| 7,442,333 B2 | 10/2008 | Presenz et al. | |
| 2005/0187355 A1 | 8/2005 | Tasaka | |
| 2005/0189030 A1 | 9/2005 | Katayama | |
| 2006/0178466 A1 * | 8/2006 | Kim et al. ................ 524/445 |
| 2010/0084404 A1 | 4/2010 | Page et al. | |
| 2010/0144920 A1 | 6/2010 | Page et al. | |
| 2011/0028623 A1 * | 2/2011 | Qian et al. ................ 524/261 |

FOREIGN PATENT DOCUMENTS

| | | |
|---|---|---|
| KR | 20030017216 | 3/2003 |
| WO | 2008040531 | 4/2008 |
| WO | 2008042878 | 4/2008 |

OTHER PUBLICATIONS

Abstract of KR 10-2003-0017216, "Method of Preparing Nanocomposites of Thermoplastic Elastomer".

* cited by examiner

*Primary Examiner* — Vickey Nerangis
(74) *Attorney, Agent, or Firm* — John H. Hornickel; Michael J. Sambrook

(57) ABSTRACT

A blend of styrene-isobutylene-styrene based thermoplastic elastomer and organoclay-filled polyamide is disclosed which has good processability and more effective barrier properties for oxygen than the blend using amorphous or crystalline polyamide without organoclay.

15 Claims, No Drawings

THERMOPLASTIC ELASTOMERS EXHIBITING SUPERIOR BARRIER PROPERTIES

CLAIM OF PRIORITY

This application is a continuation of U.S. application Ser. No. 12/936,372 filed on Oct. 4, 2010, which was the U.S. National Stage of International Application Number PCT/US2009/040906 filed on Apr. 17, 2009, which claims the benefit of U.S. Provisional Patent Application Ser. No. 61/047,047 filed on Apr. 22, 2008; each of which is incorporated by reference.

FIELD OF THE INVENTION

This invention relates to thermoplastic elastomers containing organoclay-filled polyamide to provide barrier properties.

BACKGROUND OF THE INVENTION

The world of polymers has progressed rapidly to transform material science from wood and metals of the 19$^{th}$ Century to the use of thermoset polymers of the mid-20$^{th}$ Century to the use of thermoplastic polymers of later 20$^{th}$ Century.

An example of a popular rubber is butyl rubber which has excellent gas barrier properties. But butyl rubber is not capable of being injection molded.

Thermoplastic elastomers (TPEs) combine the benefits of elastomeric properties of thermoset polymers, such as vulcanized rubber, with the processing properties of thermoplastic polymers. Therefore, TPEs are preferred because they can be made into articles using injection molding equipment. But often, TPEs lack gas barrier properties comparable to butyl rubber.

U.S. Pat. No. 7,150,294 (Katayama et al.) discloses a two layer hose with an outer layer of a blend of styrene-isobutylene block copolymer and polyamide, and preferably also including a compatibilizer.

SUMMARY OF THE INVENTION

What the art needs is a new formulation of thermoplastic elastomer (TPE) that has gas barrier properties approaching those of butyl rubber.

The present invention solves that problem by using a TPE formulation that includes organoclay-filled polyamide.

One aspect of the invention is a thermoplastic elastomer compound, comprising (a) styrene-isobutylene-styrene and (b) polyamide including organoclay dispersed in the polyamide.

Features of the invention will become apparent with reference to the following embodiments.

EMBODIMENTS OF THE INVENTION

TPE-S

One type of TPE is based on styrene (also called "TPE-S"). The present invention uses a TPE-S based on styrene-isobutylene-styrene ("SIBS") as the matrix polymer for the TPE. A commercial source of SIBS is Kaneka of Japan. SIBS is becoming increasingly popular as a high-value TPE-S, as noted in U.S. Pat. No. 7,150,294 (Katayama et al.)

Typically, commercial grades of TPE-S are a complex combination of TPE, plasticizer, processing aid (mold release agent), filler, antioxidant, and one or more secondary polymers, such as polyolefins.

Polyamide as Secondary Polymer

In the present invention, the TPE-S includes polyamide as a secondary polymer. The polyamide can be amorphous or crystalline. Any amorphous or crystalline polyamide among the following list is a candidate for use in this invention: polyamide 6; polyamide 6,6; polyamide 9,9; polyamide 6,10; polyamide 6,12; polyamide 11; polyamide 9,10; polyamide 9,12; polyamide 12; a copolymer of polyamide 6 and polyamide 6,6; a copolymer of polyamide 6 and polyamide 12; and combinations thereof.

Regardless of the polyamide employed, the polyamide needs to have dispersed therein an organoclay. Despite the considerable difference in cohesive energy densities between SIBS and polyamide, an organoclay filled polyamide ("Nanonylon" for convenience in this application) provides unexpected superior barrier properties over even that of SIBS and polyamide alone, which itself is a considerable improvement over SIBS alone.

Organoclay

Organoclay is obtained from inorganic clay usually from the smectite family. Smectites have a unique morphology, featuring one dimension in the nanometer range. Montmorillonite clay is the most common member of the smectite clay family. The montmorillonite clay particle is often called a platelet, meaning a sheet-like structure where the dimensions in two directions far exceed the particle's thickness.

Inorganic clay becomes commercially significant if intercalated with an organic intercalant to become an organoclay. An intercalate is a clay-chemical complex wherein the clay gallery spacing has increased, due to the process of surface modification by an intercalant. Under the proper conditions of temperature and shear, an intercalate is capable of exfoliating in a resin polyolefin matrix. An intercalant is an organic or semi-organic chemical capable of entering the montmorillonite clay gallery and bonding to the surface. Exfoliation describes a dispersion of an organoclay (surface treated inorganic clay) in a plastic matrix. In this invention, organoclay is exfoliated at least to some extent.

In exfoliated form, inorganic clay platelets have a flexible sheet-type structure which is remarkable for its very small size, especially the thickness of the sheet. The length and breadth of the particles range from 1.5 μm down to a few tenths of a micrometer. However, the thickness is astoundingly small, measuring only about a nanometer (a billionth of a meter). These dimensions result in extremely high average aspect ratios (200-500). Moreover, the miniscule size and thickness mean that a single gram contains over a million individual particles.

Nanocomposites are the combination of the organoclay and the plastic matrix. In this invention, Nanonylon is the nanocomposite which provides the unexpected results. In polymer compounding, a nanocomposite is a very convenient means of delivery of the organoclay into the ultimate compound, provided that the plastic matrix is compatible with the principal polymer resin components of the compounds. In such manner, nanocomposites are available in concentrates, masterbatches, and compounds from CP Polymers of Pasadena, Calif., Nanocor, Inc. of Arlington Heights, Ill. (www.nanocor.com) and PolyOne Corporation of Avon Lake, Ohio (www.polyone.com) in a variety of nanocomposites. Particularly preferred organoclays are I24TL, 130P, I44P, and I44W from Nanocor, Inc. which can then be dispersed into amorphous or crystalline polyamide.

Nanocomposites offer flame-retardancy properties because such nanocomposite formulations burn at a noticeably reduced burning rate and a hard char forms on the surface. They also exhibit minimum dripping and fire sparkling.

Nanocomposites also have improved barrier properties as compared with the plastic matrix without organoclay.

The amount of organoclay in the Nanonylon can range from about 1 to about 8 weight percent, and preferably from about 3 to about 8 weight percent.

Optional Additives

The compound of the present invention can include conventional plastics additives in an amount that is sufficient to obtain a desired processing or performance property for the compound. The amount should not be wasteful of the additive nor detrimental to the processing or performance of the compound. Those skilled in the art of thermoplastics compounding, without undue experimentation but with reference to such treatises as *Plastics Additives Database* (2004) from Plastics Design Library (www.williamandrew.com), can select from many different types of additives for inclusion into the compounds of the present invention.

Non-limiting examples of optional additives include adhesion promoters; biocides (antibacterials, fungicides, and mildewcides), anti-fogging agents; anti-static agents; bonding, blowing and foaming agents; dispersants; fillers and extenders; fire and flame retardants and smoke suppresants; impact modifiers; initiators; lubricants; micas; pigments, colorants and dyes; oils and plasticizers; processing aids; release agents; silanes, titanates and zirconates; slip and anti-blocking agents; stabilizers; stearates; ultraviolet light absorbers; viscosity regulators; waxes; and combinations of them.

Table 1 shows the acceptable and desirable ranges of ingredients for the TPE-S of the present invention. All but the SIBS and Nanonylon are optional for the present invention.

TABLE 1

Ranges of Ingredients

| Ingredient (Wt. Percent) | Acceptable | Desirable |
| --- | --- | --- |
| SIBS | 20-90% | 30-85% |
| Nanonylon | 5-50% | 10-30% |
| Plasticizer | 0-70% | 0-50% |
| Other Polymer(s) | 0-50% | 0-15% |
| Processing Aid - Mold Release | 0-2% | 0-0.5% |
| Filler | 0-40% | 0-15% |
| Anti-oxidant | 0-1% | 0-0.2% |
| Other Optional Additives | 0-10% | 0-5% |

Processing

The preparation of compounds of the present invention is uncomplicated. The compound of the present can be made in batch or continuous operations.

Mixing in a continuous process typically occurs in an extruder that is elevated to a temperature that is sufficient to melt the polymer matrix with addition either at the head of the extruder or downstream in the extruder of the solid ingredient additives. Plasticizer oil can be pre-mixed with the SEBS, if SEBS is included in the formulation, in a ribbon blender or optionally added downstream by injection. Extruder speeds can range from about 50 to about 500 revolutions per minute (rpm), and preferably from about 100 to about 300 rpm. Typically, the output from the extruder is pelletized for later extrusion or molding into polymeric articles.

Mixing in a batch process typically occurs in a Banbury mixer that is also elevated to a temperature that is sufficient to melt the polymer matrix to permit addition of the solid ingredient additives. The mixing speeds range from 60 to 1000 rpm and temperature of mixing can be ambient. Also, the output from the mixer is chopped into smaller sizes for later extrusion or molding into polymeric articles.

Subsequent extrusion or molding techniques are well known to those skilled in the art of thermoplastics polymer engineering. Without undue experimentation but with such references as "Extrusion, The Definitive Processing Guide and Handbook"; "Handbook of Molded Part Shrinkage and Warpage"; "Specialized Molding Techniques"; "Rotational Molding Technology"; and "Handbook of Mold, Tool and Die Repair Welding", all published by Plastics Design Library (www.williamandrew.com), one can make articles of any conceivable shape and appearance using compounds of the present invention.

USEFULNESS OF THE INVENTION

TPE-S of the present invention, based on SIBS and Nanonylon provides gas barrier properties comparable to butyl rubber. As such, and with the advantage of being capable of being injection molded, plastic articles can be made from formulations of the present invention for such uses as seals, closures, and other articles previously made from butyl rubber. Other articles can be made from the TPE-S nanocomposites of the present invention, such as the following industrial and consumer products: food and drink container seals, printer cartridge seals, medical container seals, baby pacifiers, and other products needing both flexibility and barrier properties, as a suitable replacement for butyl rubber.

EXAMPLES

Table 2 shows two examples of the present invention, in comparison with a control (Comparative Example A) and four comparison examples (Comparative Examples B-E) representing a TPE-S with either amorphous or crystalline nylon which does not contain organoclay.

All formulations of Examples 1-2 and Comparative Examples A-E had the same SIBS TPE-S matrix. All formulations of Examples 1-2 and Comparative Examples B-E had the same SIBS TPE-S matrix and antioxidant. Comparative Examples B and D offered a direct comparison with Example 1, while Comparative Examples C and E offered a direct comparison with Example 2. Only the type of polyamide was different.

All of Examples 1-2 and B-E were made using a twin-screw extruder set at 238° C. in all zones, rotating at 500 rpm. All ingredients were added before Zone 1. The melt-mixed compound was pelletized for further handling.

Pellets of all Examples 1-2 and A-E were molded into tensile test bars using a Demag injection molding machine, operating at 190° C. temperature and high pressure. Table 3 shows experimental results.

TABLE 2

Formulations

| Ingredient/Commercial Source (Parts by Weight) | Purpose | Comp. A | Comp. B | Comp. C | Comp. D | Comp. E | 1 | 2 |
|---|---|---|---|---|---|---|---|---|
| Sibstar 073T SIBS (Mw = 83,000) (Kaneka, Japan) | TPE-S Matrix | 100 | 85 | 70 | 85 | 70 | 85 | 70 |
| Selar 3426 Amorphous polyamide (DuPont, Wilmington, DE, USA) | Barrier | | 15 | 30 | | | | |
| Ultramid 8202 polyamide 6 (BASF, Florham Park, NJ, USA) | Barrier | | | | 15 | 30 | | |
| CRESS-ALON A NE2740 Injection Grade Nanonylon (CP Polymers, Pasadena, CA, USA) (Contains polyamide 6 and 4% organoclay) | Barrier | | | | | | 15 | 30 |
| Irganox 1010 Antioxidant (Ciba, Switzerland) | Antioxidant/ UV package | | 0.1 | 0.1 | 0.1 | 0.1 | 0.1 | 0.1 |

TABLE 3

Physical Properties

| Ingredient/Commercial Source (Parts by Weight) | Comp. A | Comp. B | Comp. C | Comp. D | Comp. E | 1 | 2 |
|---|---|---|---|---|---|---|---|
| Shore A Hardness (ASTM D2240, 10 s delay) | 50 | 55 | 64 | 56 | 70 | 68 | 89 |
| Specific Gravity (ASTM D792) | 0.96 | 0.99 | 1.01 | 0.97 | 1.00 | 0.97 | 0.99 |
| Tensile Strength, psi (ASTM D412, Die C) | 1195 | 1431 | 1816 | 1391 | 1779 | 1196 | 1855 |
| Elongation, % (ASTM D412, Die C) | 422 | 254 | 151 | 327 | 226 | 292 | 83 |
| Tear Strength, pli (ASTM D624) | 155 | 135 | 158 | 166 | 296 | 234 | 386 |
| Oxygen Transmission Rate (OTR), cc · mil/m² · day (ASTM D3985) | 3010 | 1880 | 1210 | 1610 | 410 | 570 | 55 |
| Percent OTR Improvement of Example 1 Over Comparative Examples A, B, and D | 528% | 329% | | 282% | | | |
| Percent OTR Improvement of Example 2 Over Comparative Examples A, C, and E | 5472% | | 2200% | | 745% | | |

Table 3 shows the physical properties of Examples 1-2 and Comparative Examples A-E are comparable or manageable for Shore A hardness, Specific Gravity, Tensile Strength, Percent Elongation, and Tear Strength.

What is totally unexpected is the amount of oxygen transmission rate decrease in Examples 1 and 2, when compared to neat SIBS (Comparative Example A) or SIBS and amorphous nylon (Comparative Examples B and C) or SIBS and crystalline nylon (Comparative Examples D and E).

Example 1 with Nanonylon at 15 parts by weight has two to three times the oxygen barrier performance over use of amorphous or crystalline nylon at the same weight percent. Example 2 with Nanonylon at 30 parts by weight has seven to 22 times the oxygen barrier performance over use of amorphous or crystalline nylon at the same weight percent.

Therefore, using Examples 1 and 2 and other explanations of the present invention in this document, one of ordinary skill in the art, without undue experimentation, will be able to formulate to achieve the appropriate balance of physical processing and physical performance properties while at the same time achieving extraordinarily and unexpectedly superior oxygen barrier properties.

The invention is not limited to the above embodiments. The claims follow.

What is claimed is:

1. A thermoplastic elastomer compound comprising:
   (a) from about 70 to about 85 weight percent of styrene-isobutylene-styrene thermoplastic elastomer; and
   (b) from about 15 to about 30 weight percent of polyamide including organoclay dispersed in the polyamide;

wherein the compound has flexibility and oxygen barrier properties such that:
   (A) when the compound comprises about 85 weight percent of styrene-isobutylene-styrene thermoplastic elastomer and about 15 weight percent of polyamide including organoclay dispersed in the polyamide, the compound has:
      (i) Shore A hardness (ASTM D2240, 10 seconds delay) of 68;
      (ii) Percent Elongation (ASTM D412, Die C) of 292; and
      (iii) Oxygen Transmission Rate (ASTM D3985 cc·mil/m²·day) of 570; and
   (B) when the compound comprises about 70 weight percent of styrene-isobutylene-styrene thermoplastic elastomer and about 30 weight percent of polyamide including organoclay dispersed in the polyamide, the compound has:
      (i) Shore A hardness (ASTM D2240, 10 seconds delay) of 89;
      (ii) Percent Elongation (ASTM D412, Die C) of 83; and
      (iii) Oxygen Transmission Rate (ASTM D3985 cc·mil/m²·day) of 55.

2. The compound of claim 1 further comprising plasticizer oil.

3. The compound of claim 1 further comprising filler.

4. The compound of claim 1 further comprising at least one additive selected from the group consisting of adhesion promoters; biocides; anti-fogging agents; anti-static agents; bonding agents; blowing agents; foaming agents; dispersants; fillers; extenders; fire retardants; flame retardants; smoke suppressants; impact modifiers; initiators; lubricants; micas; pigments; colorants; dyes; oils; plasticizers; processing aids; release agents; silanes; titanates; zirconates; slip agents; anti-blocking agents; stabilizers; stearates; ultraviolet light absorbers; viscosity regulators; waxes; and combinations of them.

5. The compound of claim 1, wherein the organoclay is exfoliated within the polyamide, and wherein the polyamide comprises from about 1 to about 8 weight percent of the organoclay.

6. A method of using the compound of claim 1, the method comprising the step of molding the compound into an article that has more than about 280% improvement in reduced oxygen transmission relative to a compound which has the same styrene-isobutylene-styrene thermoplastic elastomer and polyamide but no organoclay.

7. The method of claim 6, wherein the article is in a form of a seal or a closure.

8. The method of claim 6, wherein the article is in a form selected from the group consisting of a food or drink container seal, a printer cartridge seal, and a medical container seal.

9. A molded article formed from a thermoplastic elastomer compound comprising:
   (a) from about 70 to about 85 weight percent of styrene-isobutylene-styrene thermoplastic elastomer; and
   (b) from about 15 to about 30 weight percent of polyamide including organoclay dispersed in the polyamide;
   wherein the molded article has flexibility and oxygen barrier properties such that:
   (A) when the compound comprises about 85 weight percent of styrene-isobutylene-styrene thermoplastic elastomer and about 15 weight percent of polyamide including organoclay dispersed in the polyamide, the molded article has:
      (i) Shore A hardness (ASTM D2240, 10 seconds delay) of 68;
      (ii) Percent Elongation (ASTM D412, Die C) of 292; and
      (iii) Oxygen Transmission Rate (ASTM D3985 cc·mil/m²·day) of 570; and
   (B) when the compound comprises about 70 weight percent of styrene-isobutylene-styrene thermoplastic elastomer and about 30 weight percent of polyamide including organoclay dispersed in the polyamide, the molded article has:
      (i) Shore A hardness (ASTM D2240, 10 seconds delay) of 89;
      (ii) Percent Elongation (ASTM D412, Die C) of 83; and
      (iii) Oxygen Transmission Rate (ASTM D3985 cc·mil/m²·day) of 55.

10. The molded article of claim 9, wherein the compound further comprises plasticizer oil.

11. The molded article of claim 9, wherein the compound further comprises filler.

12. The molded article of claim 9, wherein the compound further comprises at least one additive selected from the group consisting of adhesion promoters; biocides; anti-fogging agents; anti-static agents; bonding agents; blowing agents; foaming agents; dispersants; fillers; extenders; fire retardants; flame retardants; smoke suppressants; impact modifiers; initiators; lubricants; micas; pigments; colorants; dyes; oils; plasticizers; processing aids; release agents; silanes; titanates; zirconates; slip agents; anti-blocking agents; stabilizers; stearates; ultraviolet light absorbers; viscosity regulators; waxes; and combinations of them.

13. The molded article of claim 9, wherein the organoclay is exfoliated within the polyamide, and wherein the polyamide comprises from about 1 to about 8 weight percent of the organoclay.

14. The molded article of claim 9, wherein the molded article is in a form of a seal or a closure.

15. The molded article of claim 9, wherein the molded article is in a form selected from the group consisting of a food or drink container seal, a printer cartridge seal, and a medical container seal.

* * * * *